US010281079B2

(12) United States Patent
Zheng et al.

(10) Patent No.: US 10,281,079 B2
(45) Date of Patent: May 7, 2019

(54) INSULATED FLUID CONDUIT

(71) Applicant: GENERAL ELECTRIC COMPANY, Schenectady, NY (US)

(72) Inventors: Huabing Zheng, Niskayuna, NY (US); Donald Joseph Buckley, Schenectady, NY (US); Scott Michael Miller, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 14/840,678

(22) Filed: Aug. 31, 2015

(65) Prior Publication Data
US 2017/0059079 A1 Mar. 2, 2017

(51) Int. Cl.
*F16L 59/14* (2006.01)

(52) U.S. Cl.
CPC .................................. *F16L 59/14* (2013.01)

(58) Field of Classification Search
CPC ....................................................... F16L 59/14
USPC .................................. 138/146, 149, 140, 137
See application file for complete search history.

(56) References Cited

U.S. PATENT DOCUMENTS

| 3,904,111 | A | 9/1975 | Petersson |
|---|---|---|---|
| 4,348,243 | A * | 9/1982 | Craubner .............. F16L 59/028 138/149 |
| 4,429,213 | A | 1/1984 | Mathieu |
| 4,454,248 | A | 6/1984 | Pollock et al. |
| 6,000,438 | A * | 12/1999 | Ohrn ........................ E21B 17/01 138/149 |
| 6,746,761 | B2 | 6/2004 | Janoff |
| 7,105,104 | B2 | 9/2006 | Chomard et al. |
| 7,226,243 | B2 | 6/2007 | Lee et al. |
| 7,745,379 | B2 | 6/2010 | Collins |
| 7,896,033 | B2 | 3/2011 | Hallot et al. |

(Continued)

FOREIGN PATENT DOCUMENTS

| DE | 10256553 A1 | 6/2004 |
|---|---|---|
| EP | 0223408 A2 | 5/1987 |

OTHER PUBLICATIONS

Bell et al., "The McPIPE™ Extended Cooldown System: One week (and more) of Safe Cooldown", 14th Deep Offshore Technology Conference, Nov. 13-15, 2002, pp. 12, New Orleans, Louisiana.

(Continued)

*Primary Examiner* — Craig M Schneider
*Assistant Examiner* — David R Deal
(74) *Attorney, Agent, or Firm* — BHGE/Marc A. Vivenzio

(57) ABSTRACT

The present invention provides an insulated fluid conduit useful in facilities in which a hot fluid susceptible to deleterious phase changes in response to heat loss to a cold environment is transported. Such conduits may be particularly well suited to improve thermal control in subsea hydrocarbon production operations in which hot production fluids may undergo deleterious phase changes as a result of heat loss to the cold subsea environment. The fluid conduit includes an insulating material containing a silicone rubber and a phase change material such as octadecane. One or more barrier layers inhibit migration of the phase change material from the insulation layer and into the environment. In one or more embodiments, the phase change material is present as a microencapsulated phase change material.

6 Claims, 7 Drawing Sheets

(56) References Cited

U.S. PATENT DOCUMENTS

| | | | |
|---|---|---|---|
| 8,430,169 B2 | 4/2013 | Stoisits et al. | |
| 9,057,465 B2 * | 6/2015 | Glejbol | F16L 11/08 |
| 2003/0131623 A1 | 7/2003 | Suppes | |
| 2005/0208300 A1 | 9/2005 | Magill et al. | |
| 2005/0214547 A1 | 9/2005 | Pasquier et al. | |
| 2010/0043906 A1 | 2/2010 | Jackson et al. | |
| 2011/0186169 A1 | 8/2011 | Pionetti et al. | |
| 2011/0232799 A1 | 9/2011 | Tribout et al. | |
| 2012/0261019 A1 | 10/2012 | Glejboel | |
| 2014/0030458 A1 | 1/2014 | Van Eibergen et al. | |
| 2014/0246374 A1 | 9/2014 | Shojaei-Zadeh et al. | |
| 2014/0311614 A1 | 10/2014 | Edmondson et al. | |
| 2016/0018049 A1 | 1/2016 | Yodogawa et al. | |

OTHER PUBLICATIONS

Denniel et al., "Review of Flow Assurance Solutions for Deepwater Fields", Offshore Technology Conference, pp. 10, 2004, pp. 10, Houston, Texas.

Zheng, et al., Aug. 1, 2016, U.S. Appl. No. 15/224,782.

Non-Final Rejection towards related U.S. Appl. No. 15/224,782 dated Apr. 20, 2017.

Janoff et al., "Prediction of Cool Down Times and Designing of Insulation for Subsea Production Equipment", Offshore Technology Conference, pp. 6, Houston, Texas, 2004.

Parsazadeh et al., "Thermal Insulation with Latent Energy Storage for Flow Assurance in Subsea Pipelines", ASME 2015 34th International Conference on Ocean, Offshore and Arctic Engineering, vol. 5B, pp. 6, May 31-Jun. 5, 2015.

International Search Report and Written Opinion issued in connection with corresponding Application No. PCT/US2016/048002 dated Nov. 3, 2016.

\* cited by examiner

INSULATED FLUID CONDUIT

The present invention relates to equipment useful in fluid production operations taking place in cold environments. In particular, the invention relates to insulated fluid conduits, their manufacture, and systems containing them.

BACKGROUND

Many beneficial human manufacturing and energy production activities involve the transport of a heated fluid in a fluid conduit situated in a cold environment. Where the fluid is susceptible to solidification or becoming unmanageably viscous because of heat loss to the cold environment, prudent engineering practices include insulating pipes against passive heat loss to the environment and/or actively heating the fluid conduit along its length.

Heat loss and its attendant consequences may become particularly severe where flow of the heated fluid through the conduit is interrupted. The conduit, containing the heated liquid gradually cools via heat loss to the environment and the fluid may solidify or become unmanageably viscous within the conduit. When flow is resumed, the thermally depleted matter within the fluid conduit may prevent or delay the resumption of fluid flow within the fluid conduit. Problems can be particularly severe when the heated fluid readily crystallizes on cooling, as is the case with relatively pure phenol (melting point 43° C., CAS No. 108-95-2) or otherwise forms solids on cooling. (See natural gas hydrates for example.)

Thus, heat retention within fluid conduits may be critical to the efficient operation of facilities in which a hot fluid susceptible to deleterious phase changes in response to heat loss to a cold environment is transported. There is at present a particular need for improved thermal control in subsea hydrocarbon production operations in which hot production fluids may undergo deleterious phase changes as a result of heat loss to the cold subsea environment. The present invention provides one or more embodiments enabling improved thermal control in such environments.

BRIEF DESCRIPTION

In one embodiment, the present invention provides an insulated fluid conduit comprising: (a) a conduit inner surface defining a flow channel; (b) a conduit outer surface; (c) a first insulating layer comprising a silicone rubber and a phase change material; and (d) at least one barrier layer configured to inhibit migration of the phase change material into the environment.

In an alternate embodiment, the present invention provides an insulated fluid conduit comprising: (a) a conduit inner surface defining a flow channel; (b) a conduit outer surface; (c) a first insulating layer comprising a silicone rubber and a first phase change material; (d) a second insulating layer comprising a silicone rubber and a second phase change material; and (e) at least one barrier layer configured to inhibit migration of phase change material into the environment.

In yet another embodiment, the present invention provides an insulated fluid conduit comprising: (a) a conduit inner surface defining a flow channel; (b) a conduit outer surface; (c) a first insulating layer comprising a silicone rubber configured as an open cell foam defining a network of voids and a phase change material disposed therein; and (d) at least one barrier layer configured to inhibit migration of the phase change material into the environment.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
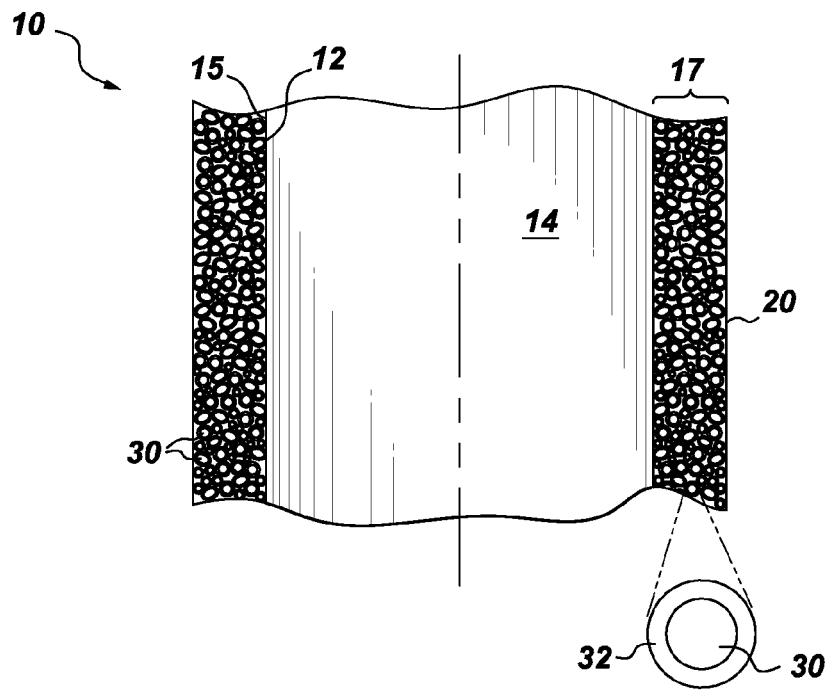
FIG. 1 illustrates one or more embodiments of the present invention.

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As noted, in one embodiment, the present invention provides an insulated fluid conduit comprising: (a) a conduit inner surface defining a flow channel; (b) a conduit outer surface; (c) a first insulating layer comprising a silicone rubber and a phase change material; and (d) at least one barrier layer configured to inhibit migration of the phase change material into the environment. The fluid conduit may be of any type which may be used to transport or control the flow of a fluid, such as a production fluid from a hydrocarbon reservoir. Such conduits include pipes, valves, manifolds, joints, Christmas trees, risers and tie-backs such as may be useful in subsurface aquatic environments adjacent to a subsea hydrocarbon reservoir. Such conduits find use as well in surface environments where the ambient temperature may be exceedingly cold.

In one or more embodiments, the present invention provides an insulated fluid conduit which is a component of oil field equipment configured for deployment in a cold environment. In one or more embodiments, the insulated fluid conduit is a component of oil field equipment selected from the group consisting of insulated pipes, insulated valves, insulated manifolds, insulated joints, insulated Christmas trees, insulated risers and insulated tie-backs.

The insulated fluid conduit comprises a first insulating layer comprising a silicone rubber and a phase change material. The insulating layer may be applied to a surface of the conduit as a composition comprising a curable silicone rubber precursor and one or more phase change materials. The silicone rubber precursor is then cured in place to a silicone rubber in the presence of the phase change material. A barrier layer may be applied to surfaces of the cured insulating layer susceptible to contact with the environment. Alternately, the insulating layer may be applied to the conduit surface as an article, such as a sleeve, gasket or cuttable sheet, comprising a cured silicone rubber and one or more phase change materials. In one or more embodiments, the silicone rubber is ductile over a wide temperature range (e.g. −40 to 150° C.), is hydrolytically robust, and has good heat resistance. Where a silicone rubber precursor is employed, the formulation to be applied to the conduit should be of sufficient viscosity to enable its application by trowelling and be resistant to sagging. Cure times are ideally rapid such that multiple layers may be conveniently applied and cured. Suitable silicone rubber precursors are available commercially and include XTI-1003 available from Dow Corning, M4642 available from Wacker Chemie, and Addisil UV 60 EX available from Momentive.

In one or more embodiments, the insulating layer comprises a cured silicone rubber which is an open cell foam defining a network of voids and wherein the phase change material is disposed therein. Suitable open cell foams include commercially available silicone foam materials such as open cell sponge rubbers available from Western Rubber & Supply, Inc. and Stockwell Elastomerics, Inc., and such as are disclosed in EP0223408 A2 and elsewhere within the art. The open cell silicone foam may be prepared from a mixture of precursors applied to the surface of the conduit to be protected and reacted in place. Alternately, the open cell silicone foam may be applied as a foamed article, for example a silicone foam sleeve comprising one or more phase change materials within the open cells and/or channels of the foam. A suitable barrier layer may be applied to one or more surfaces of the open cell silicone foam to prevent migration of the phase change material out of the silicone foam and into the environment.

Suitable phase change materials include materials having melting points below the typical operating temperature of the conduit, but above the temperature of the ambient environment in which the insulated fluid conduit is deployed. In one embodiment, the first insulating layer comprises a phase change material having a melting point in a range from about 10 to about 100° C. Suitable phase change materials include low molecular weight hydrocarbon waxes and fatty acid waxes. Table 1 provides examples of suitable phase change materials and physical properties related to the phase change behavior of such phase change materials. In one or more embodiments, the phase change material comprises one or more of a normal hydrocarbon selected from the group consisting of hexadecane, octadecane, and eicosane. In Table 1, Entry 1 is a paraffin wax phase change material comprised chiefly of octadecane ((n-C18). Entry 2 is a paraffin wax phase change material comprised chiefly of hydrocarbons containing from 19 to 36 carbon atoms. Entries 3 and 4 are fatty acid waxes comprised chiefly of capyrilic acid and palmitic acid respectively. Melting points are given in degrees centigrade. Cp represents the heat capacity of the phase change material in the solid and liquid states and is given in kilojoules per kilogram. The term LHF represents the latent heat of fusion of the phase change material. K(W/mk) represents the thermal conductivity of phase change material in the solid and liquid states.

TABLE 1

Suitable Phase Change Materials

| Entry | | Mp | Cp (kj/kg) | | LHF (kj/kg) | K(W/mK) | | Density (kg/m³) | |
|---|---|---|---|---|---|---|---|---|---|
| | | | solid | liquid | | solid | liquid | liquid | solid |
| 1 | n-$C_{18}$ | 28 | 2.2 | 2.2 | 223 | 0.36 | 0.15 | 774 | 814 |
| 2 | $C_{19}$-$C_{36}$ | 58 | 2.6 | 3.0 | 155 | 0.23 | 0.16 | 768 | 885 |
| 3 | caprylic acid | 16 | 2.1 | 1.9 | 141 | 0.24 | 0.14 | 862 | 1033 |
| 4 | palmitic acid | 63 | 2.1 | 2.3 | 190 | 0.24 | 0.16 | 847 | 989 |

In one or more embodiments, the phase change material is encapsulated prior to being dispersed in a curable silicone rubber. Under such circumstances, the need for a separate barrier layer at the outer surface of the cured silicone rubber is reduced or eliminated entirely since each domain comprising a phase change material is isolated within the shell which encapsulates the phase change material. A variety of microencapsulated and macroencapsulated phase change materials are available commercially, for example through Microtek, Inc. In one or more embodiments, the insulating layer comprises a cured silicone rubber and a microencapsulated phase change material comprising a mixture of octadecane and eicosane. One such microencapsulated phase change material, MPCM32D available from Microtek, shows outstanding thermal stability up to 250° C.

Suitable barrier layers for use include barrier materials which are impermeable with respect to the phase change material. Suitable barrier materials include crosslinked silicone materials such as silicone hard coat materials known in the art. Suitable barrier layers also include the same silicone rubber materials without the addition of the phase change material. For example, in one embodiment, the first insulating layer of an insulated conduit provided by the present invention may comprise a cured silicone rubber prepared from a curable formulation comprising Dow Corning's curable XTI-1003 RTV Silicone Rubber Insulation having one or more phase change materials dispersed therein. The same insulated fluid conduit may comprise a barrier layer prepared from Dow Corning XTI-1003 RTV Silicone Rubber Insulation without the one or more phase change materials. In an alternate embodiment, the barrier layer is prepared from a UV curable silicone-containing material such as Addisil UV 60 EX.

Turning now to the figures, FIG. 1 represents an insulated fluid conduit 10 provided by the present invention having a fluid conduit inner surface 12. The fluid conduit inner surface 12 defines a flow channel 14 through which a fluid may be caused to flow. A first insulating layer 17 is disposed on the outer surface 15 of the fluid conduit. In the embodiment shown, the first insulating layer comprises a silicone rubber 20 configured as a continuous phase. An encapsulated phase change material is dispersed within the silicone rubber as a discontinuous phase of the first insulating layer. The encapsulated phase change material comprises a phase change material 30 together with a barrier layer 32 which surrounds the phase change material in discrete domains dispersed within the silicone rubber.

Figure 2:
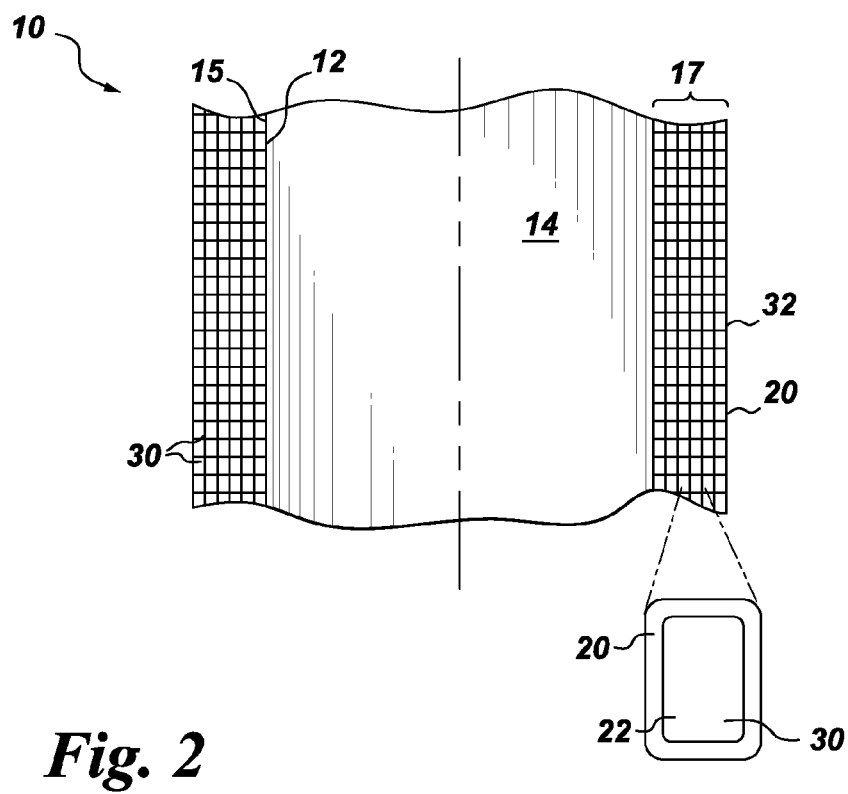
FIG. 2 illustrates one or more embodiments of the present invention.

Referring to FIG. 2, the figure represents a fluid conduit 10 provided by the present invention having a fluid conduit inner surface 12. The fluid conduit inner surface 12 defines a flow channel 14 through which a fluid may be caused to flow. A first insulating layer 17 is disposed on the outer surface 15 of the fluid conduit. In the embodiment shown, the first insulating layer comprises a silicone rubber 20 configured as an open cell foam defining a network of voids 22. One or more phase change materials 30 is dispersed within voids of the silicone rubber as a second phase of the first insulating layer. A barrier layer 32 which covers the outer surface of first insulating layer 17 prevents adventitious contact of the phase change material with the environment.

Figure 3:
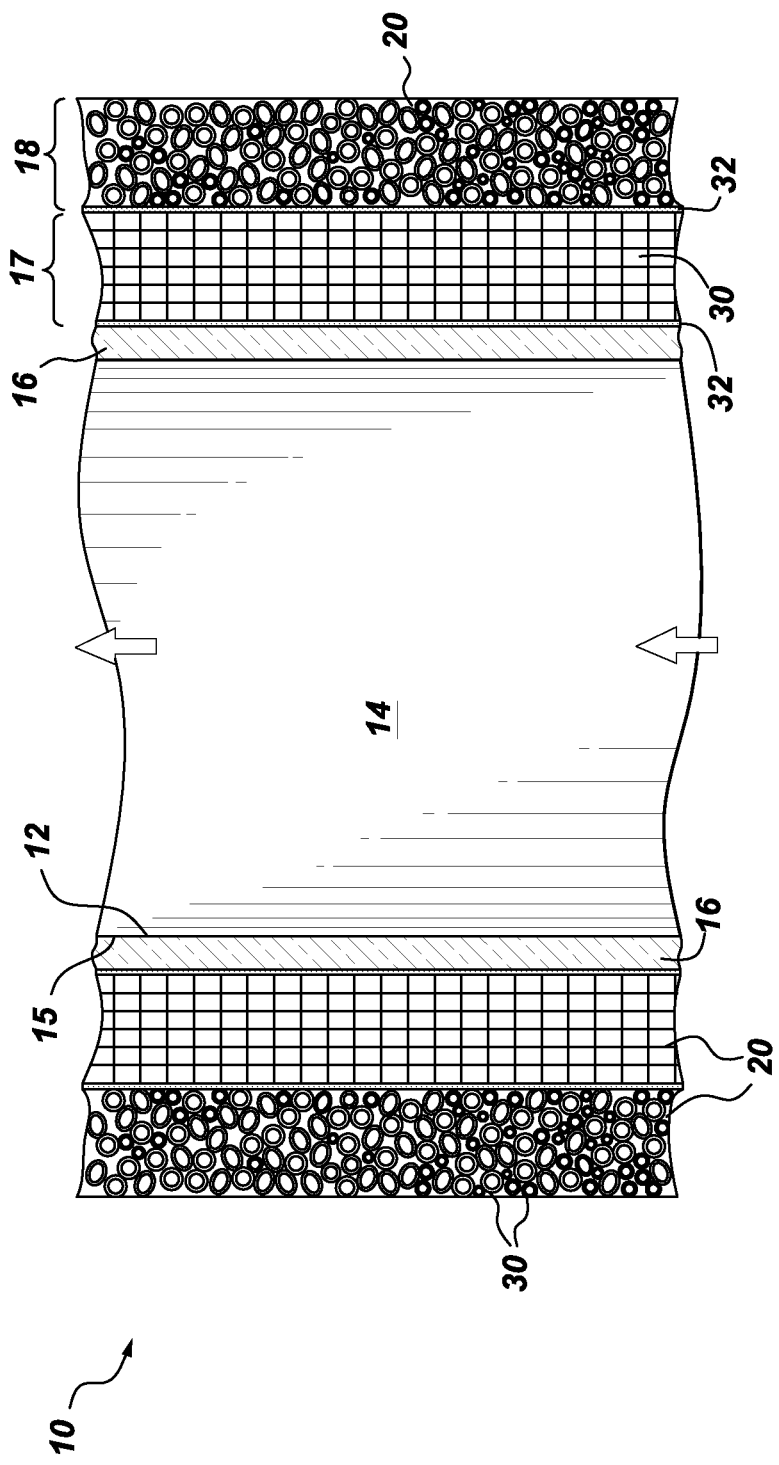
FIG. 3 illustrates one or more embodiments of the present invention.

Referring to FIG. 3, the figure represents an insulated fluid conduit 10 provided by the present invention. In the embodiment shown, the fluid conduit comprises an inner surface 12 which defines a flow channel 14 and an outer surface 15 upon which surface are disposed a thermally conductive layer 16 and first and second insulating layers 17 and 18 respectively. The purpose of the thermally conductive layer 16 is to provide for more efficient heat exchange between the first and second insulating layers 17 and 18, and the outer surface 15 of the insulated fluid conduit. For example outward heat transfer from a hot production fluid flowing through flow channel 14 to the phase change material 30 present in insulating layers 17 and 18 may be enhanced by the presence of thermally conductive layer 16. Similarly, inward heat transfer from the insulating layers to the inner and outer surfaces 12 and 15 of the fluid conduit may be enhanced by the presence of the thermally conductive layer 16 during periods of operation wherein flow through the insulated fluid conduit is reduced or stopped. Suitable thermally conductive layers include metal coatings such as nickel deposited by an electro-less nickel plating technique. Other suitable materials include thermally conductive adhesive materials as are used in support of current technologies, for example thermally conductive epoxy, silicone and elastomeric adhesives available commercially from suppliers such as Masterbond, Dow Corning and Epoxies ETC. In the embodiment shown, the first insulating layer 17 comprises a silicone rubber 20 configured as an open cell foam defining a network of voids 22 (See FIG. 2) containing one or more phase change materials 30. In one or more embodiments, the thermally conductive layer 16 functions as an adhesive and secures the first insulating layer 17 to the outer surface 15 of the fluid conduit. Barrier layers 32 inhibit or prevent movement of the phase change material 30 from voids 22 into the environment. A second insulating layer 18 configured as in FIG. 1 is disposed upon the outer barrier layer 32 of first insulating layer 17.

Figure 4:
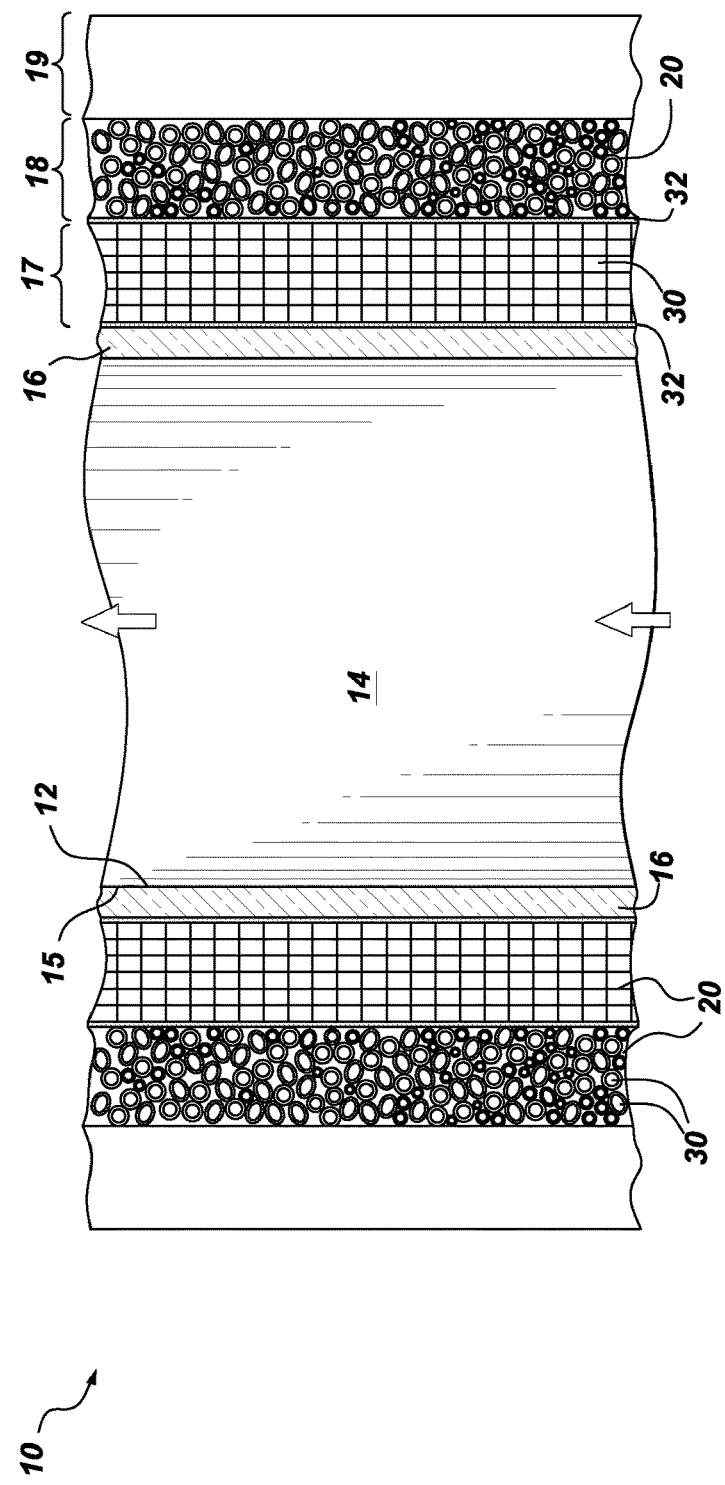
FIG. 4 illustrates one or more embodiments of the present invention.

Referring to FIG. 4, the figure represents an insulated fluid conduit 10 configured as in FIG. 3 but further comprising a third insulating layer 19 disposed around second insulating layer 18. In the embodiment shown, third insulating layer 19 does not contain a phase change material and serves to inhibit or prevent contact the underlying second insulating layer with the environment. In one or more embodiments, the third insulating layer acts to seal the underlying insulating layers and the phase change material contained within such layers within the structure of the insulated fluid conduit. In an alternate set of embodiments third insulating layer 19 may comprise one or more phase change materials.

Experimental Part

Tests were carried out on model insulating systems prepared as follows. Test formulations were prepared by hand mixing approximately 100 grams of an addition curable silicone rubber with 10 grams its curing agent (Dow Corning XTI-1003 RTV Silicone Rubber Insulation) together with 30 grams, 50 grams or 0 grams (Control) of an encapsulated phase change material MPCM32D. The uncured formulation was transferred to a 100 mL plastic beaker such that the beaker was substantially filled with the uncured formulation. A thermocouple probe was then positioned as closely as possible to the center of the beaker and held in that position for 24 hours at room temperature to provide the fully cured product comprising the cured silicone rubber, the encapsulated phase change material and the thermocouple probe. The plastic beaker was then cut away from the cured formulation. The beaker-shaped cured formulation was then heated in an oven at 50° C. for 24 hours and then removed and placed in a constant temperature bath (21-23° C. or 4° C.) and allowed to cool to constant temperature and the heat loss profile of the cured formulation was recorded. All tests were carried out in duplicate.

EXAMPLE 1

Figure 5:
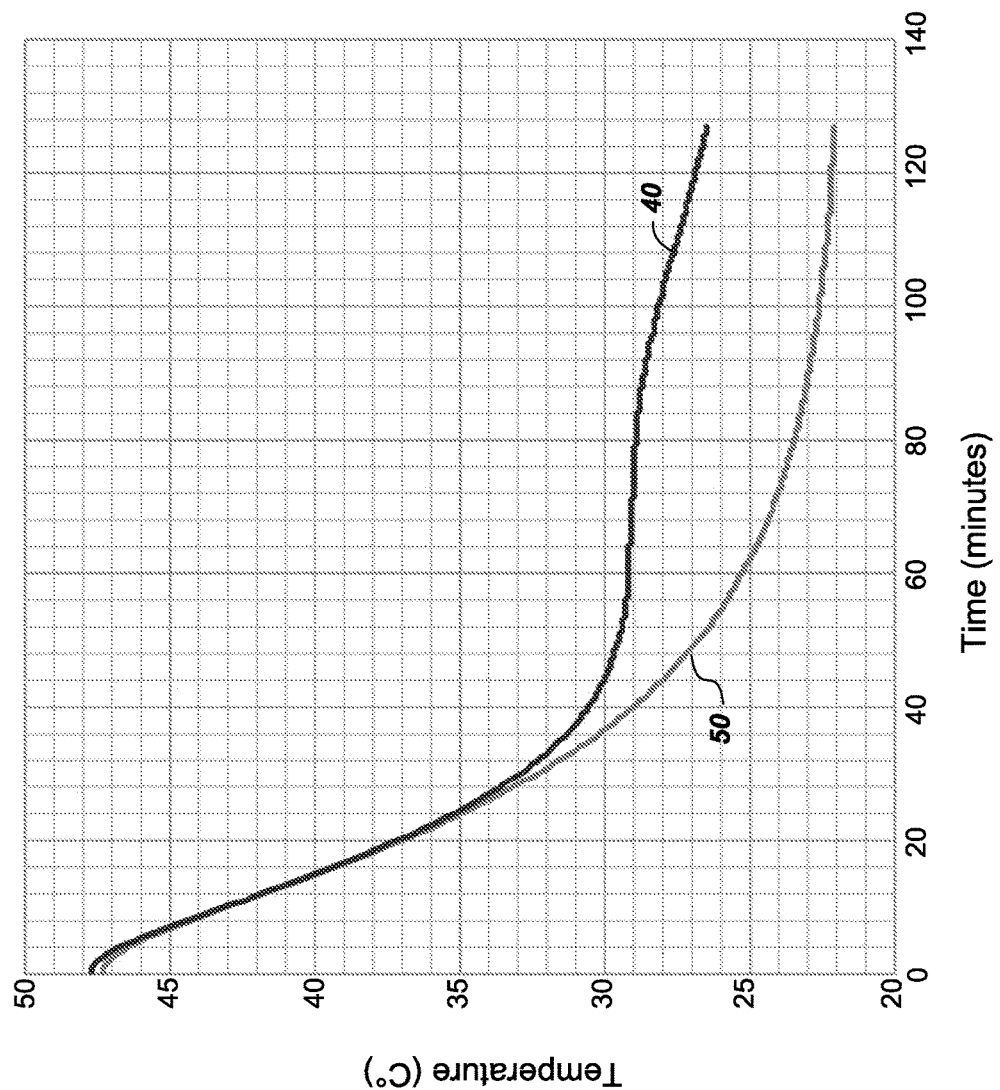
FIG. 5 illustrates the performance characteristics of a model insulation system relative to a control.

The insulation formulation was prepared, cured and tested as described above. The uncured formulation contained approximately 30 grams of the micro encapsulated phase change material MPCM32D purchased from Microtek. FIG. 5 illustrates the cool down behavior of the product insulation 40 relative to the control 50 which contained no phase change material but was otherwise identical to the product insulation. The data indicate a divergence of heat loss behavior, relative to the control, at approximately 33° C., a temperature close to the nominal melting point (32° C.) of the phase change material present in MPCM32D. It was observed that the time required for the product insulation 40 to cool from 30° C. to 28° C. was approximately 59.5 minutes, whereas the control 50 cooled from 30° C. to 28° C. in just 7 minutes. The time required for the product insulation 42 to cool from 47° C. to 23° C. was significantly greater (>127 minutes) than that observed for the control (88 minutes).

EXAMPLE 2

Figure 6:
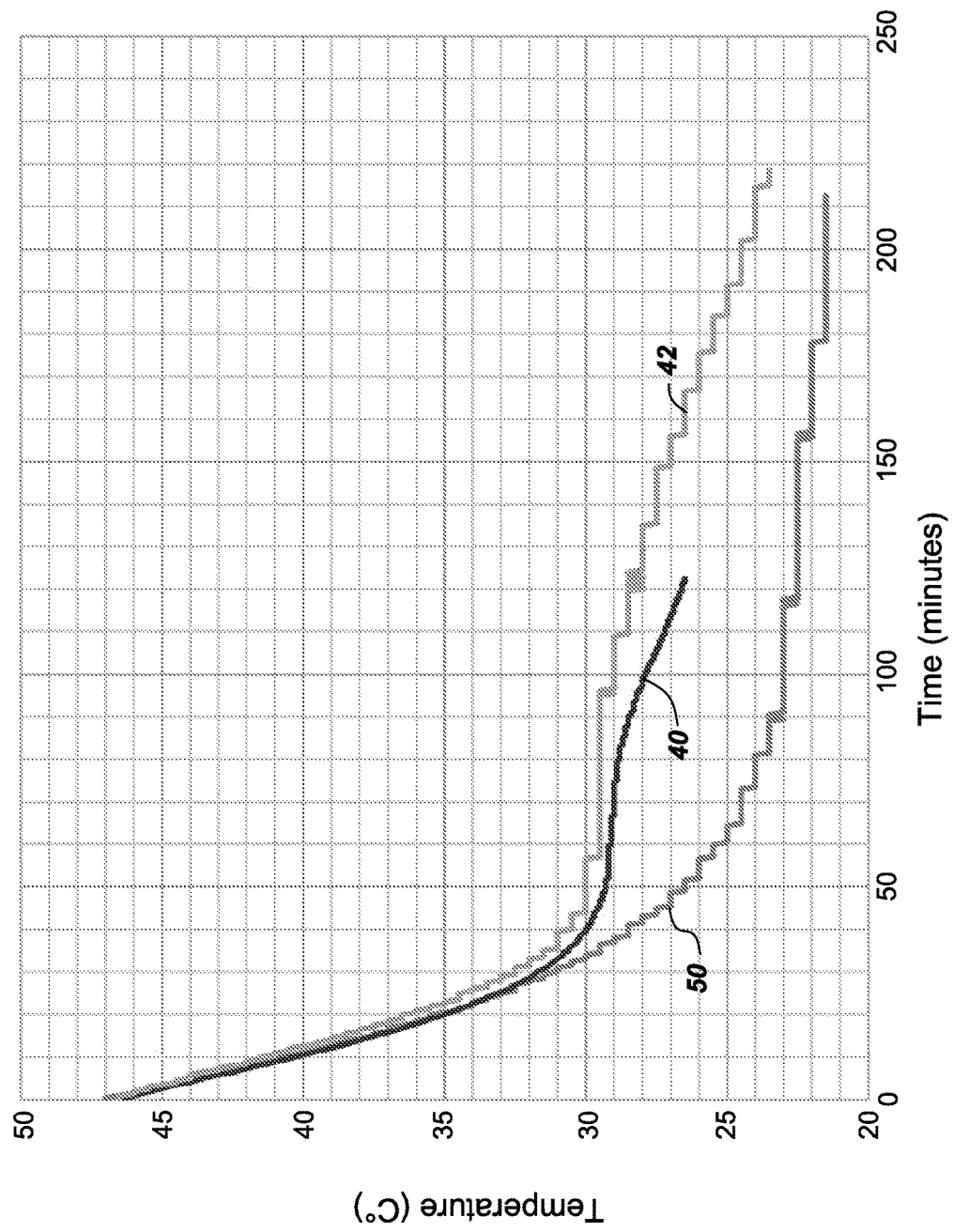
FIG. 6 illustrates the performance characteristics of a model insulation system relative to a control.

The insulation formulation was prepared, cured and tested as described above. The uncured formulation contained approximately 50 grams of the micro encapsulated phase change material MPCM32D purchased from Microtek. FIG. 6 illustrates the cool down behavior of the product insulation 42 relative to the control 50 which contained no phase change material but was otherwise identical to the product insulation. The data shown indicate a divergence of heat loss behavior at approximately 33° C., a temperature close to the nominal melting point of the phase change material present in MPCM32D. It was observed that the time required for the product insulation 44 to cool from 47° C. to 23° C. was significantly greater (>200 minutes) than that observed for the control (88 minutes).

EXAMPLE 3

Figure 7:
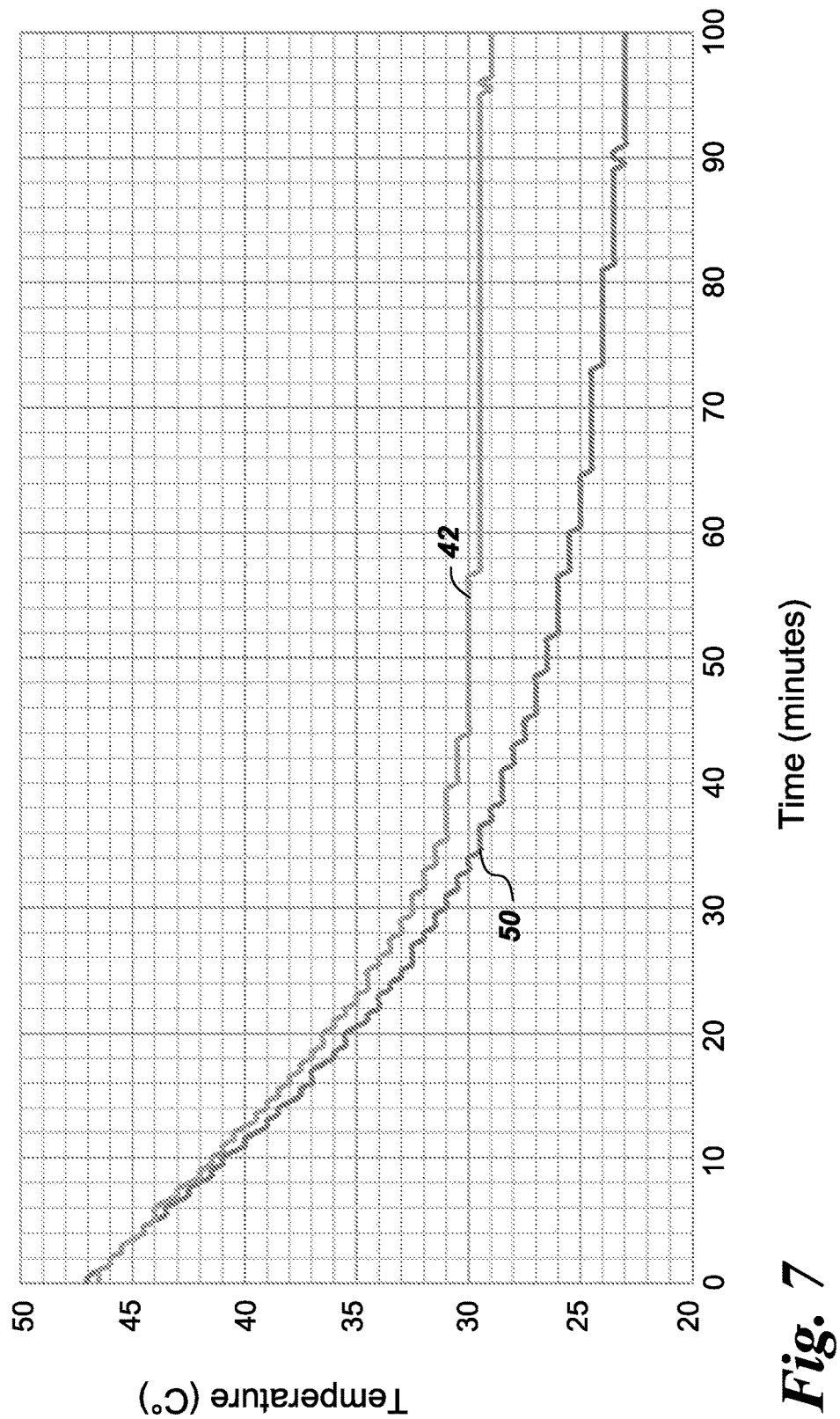
FIG. 7 illustrates the performance characteristics of a model insulation system relative to a control.

The insulation formulation was prepared, cured and tested as described above. The uncured formulation contained approximately 50 grams of the micro encapsulated phase change material MPCM32D purchased from Microtek. FIG. 7 illustrates the cool down behavior of the cured product insulation 42 relative to the control 50 in a 21° C. constant temperature bath. Again, the cool down time of the silicone rubber containing the phase change material was significantly longer than the cool down time exhibited by the control.

EXAMPLE 4

Figure 8:
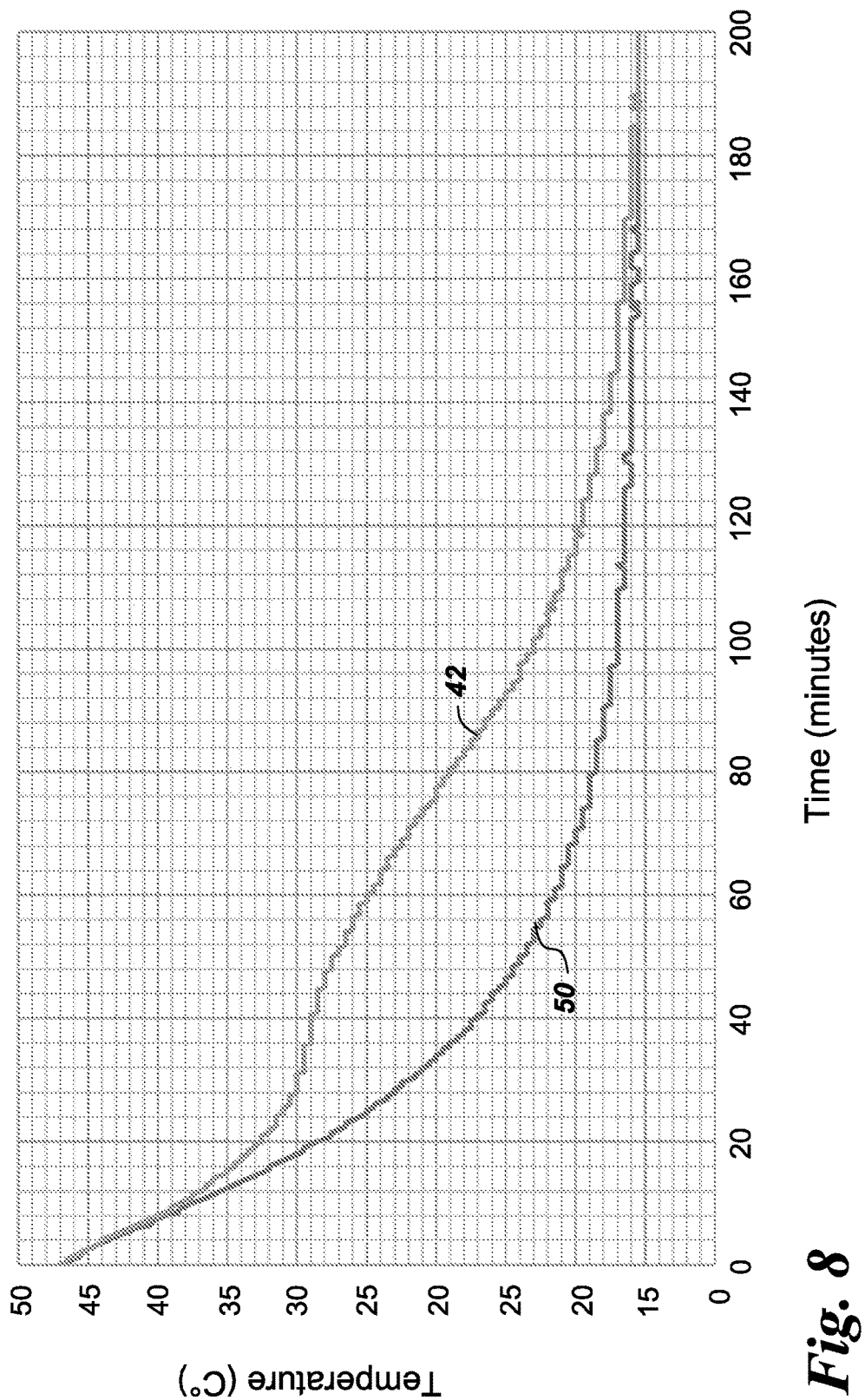
FIG. 8 illustrates the performance characteristics of a model insulation system relative to a control.

The insulation formulation was prepared, cured and tested as described above. The uncured formulation contained approximately 50 grams of the micro encapsulated phase change material MPCM32D purchased from Microtek. FIG. 8 illustrates the cool down behavior of the cured product insulation 44 relative to the control 50 in a 4° C. constant temperature bath. Again, the cool down time of the silicone rubber containing the phase change material was significantly longer than the cool down time exhibited by the control. It was observed as well that the time required for the cured product 42 to cool from 47° C. to 17° C. was approximately 87 minutes, whereas the control 50 cooled from 47° C. to 17° C. in just 40 minutes.

EXAMPLE 5 PREPARATION OF AN INSULATED PIPE SECTION

A foot-long section of steel pipe approximately 4 inches in diameter and approximately two feet long is coated with the uncured coating formulation of Example 2 while rotating the pipe on a rotary jig to a substantially uniform thickness of approximately one inch in the coated foot long section. The coating is allowed to cure at room temperature overnight to provide an insulated pipe section comprising a first insulating layer a silicone rubber and a microencapsulated phase change material. In this example, the shells of the microcapsules serve as a barrier layer configured to inhibit migration of the phase change material into the environment.

EXAMPLE 6 PREPARATION OF AN INSULATED PIPE SECTION

The outer surface of a foot-long section of steel pipe approximately 4 inches in diameter and approximately two feet long is coated with an uncured coating formulation prepared from approximately 1 kilogram of an addition curable silicone rubber with 100 grams its curing agent (Dow Corning XTI-1003 RTV Silicone Rubber Insulation) together with 300 grams of the straight chain hydrocarbon eicosane while rotating the pipe on a rotary jig to a substantially uniform thickness of approximately one inch in the coated foot long section. The coating is allowed to cure at room temperature overnight to provide an intermediate comprising the pipe and the first insulating layer comprising the cured silicone rubber and the eicosane phase change material. A layer comprising Addisil UV 60 EX available from Momentive is then applied to the outer surface of the first insulating layer and cured while rotating the pipe under an ultraviolet lamp to provide the insulated pipe section comprising both the first insulating layer and a barrier layer configured to inhibit migration of the phase change material from the first insulating layer into the environment.

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:
1. An insulated fluid conduit consisting of:
    a fluid conduit having an outer surface and an inner surface, the inner surface defining a flow channel;
    a thermally conductive layer disposed on the outer surface of the fluid conduit;
    a barrier layer disposed on an outer surface of the thermally conductive layer;
    a first insulating layer disposed on an outer surface of the barrier layer and comprising a silicone rubber and a first phase change material, wherein the silicon rubber of the first insulating layer is configured as an open cell foam defining a network of voids and wherein the first phase change material is disposed therein the voids and including at least one barrier layer disposed on an outermost surface of the silicon rubber to inhibit migration of the first phase change material into an ambient environment; and
    a second insulating layer disposed on an outer surface of the first insulating layer and comprising a silicone rubber and a second phase change material, wherein the silicon rubber of the second insulating layer is configured as a continuous phase and wherein the second phase change material is dispersed within the silicone rubber as a microencapsulated discontinuous phase, wherein at least one barrier layer surrounds the second phase change material of the second insulating layer in discrete domains dispersed within the silicone rubber to inhibit migration of the second phase change material into an ambient environment, and wherein the continuous phase of the silicon rubber of the second insulating layer is an outermost layer of the insulated fluid conduit and in contact with the ambient environment.
2. The insulated fluid conduit according to claim 1, wherein the at least one barrier layer comprises a silicone material which is impermeable with respect to phase change material.

3. The insulated fluid conduit according to claim 1, wherein the first phase change material is materially different from the second phase change material.

4. The insulated fluid conduit according to claim 1, wherein the first phase change material is essentially the same as the second phase change material.

5. The insulated fluid conduit according to claim 1, further comprising a third insulating layer.

6. The insulated fluid conduit according to claim 5, wherein the phase change material comprises eicosane.

* * * * *